(12) United States Patent
Dobashi

(10) Patent No.: US 7,304,448 B2
(45) Date of Patent: Dec. 4, 2007

(54) DEVELOPING APPARATUS AND IMAGE PROCESSING SYSTEM WITH THE DEVELOPING APPARATUS

(75) Inventor: Kazuhito Dobashi, Kofu (JP)

(73) Assignee: Nisca Corporation, Minamikoma-Gun, Yamanashi-Ken (JP)

(*) Notice: Subject to any disclaimer, the term of this patent is extended or adjusted under 35 U.S.C. 154(b) by 1171 days.

(21) Appl. No.: 10/347,305

(22) Filed: Jan. 21, 2003

(65) Prior Publication Data

US 2003/0152249 A1 Aug. 14, 2003

(30) Foreign Application Priority Data

Jan. 21, 2002 (JP) .............................. 2002-011803
Jan. 21, 2002 (JP) .............................. 2002-011813
Jan. 21, 2002 (JP) .............................. 2002-011818

(51) Int. Cl.
  *B64C 17/06* (2006.01)
(52) U.S. Cl. ...................... 318/649; 359/393; 318/135; 318/38
(58) Field of Classification Search ..................... None
See application file for complete search history.

(56) References Cited

U.S. PATENT DOCUMENTS 5,357,366 A * 10/1994 Marchlenski ............... 359/393
6,002,740 A * 12/1999 Cerrina et al. ............... 378/43
6,583,597 B2 * 6/2003 Tanaka et al. .............. 318/687

FOREIGN PATENT DOCUMENTS

JP       8-241127       9/1996
JP    2001-286296      10/2001

* cited by examiner

*Primary Examiner*—Lincoln Donovan
*Assistant Examiner*—Michael Brandt
(74) *Attorney, Agent, or Firm*—Manabu Kanesaka

(57) ABSTRACT

A developing apparatus is capable of moving a stage for supporting a substance to be developed from a detachable position to a developing area below a developing unit, and two-dimensional movement. The present developing apparatus includes a developing device, a first moving device movable in a direction of axis of ordinate and a second moving device movable in a direction of axis of abscissa, and a stage posture control device to control an inclined posture of the stage in order to hold a relative distance between the developing device and a developing area surface of the substance placed on the stage constant.

22 Claims, 11 Drawing Sheets

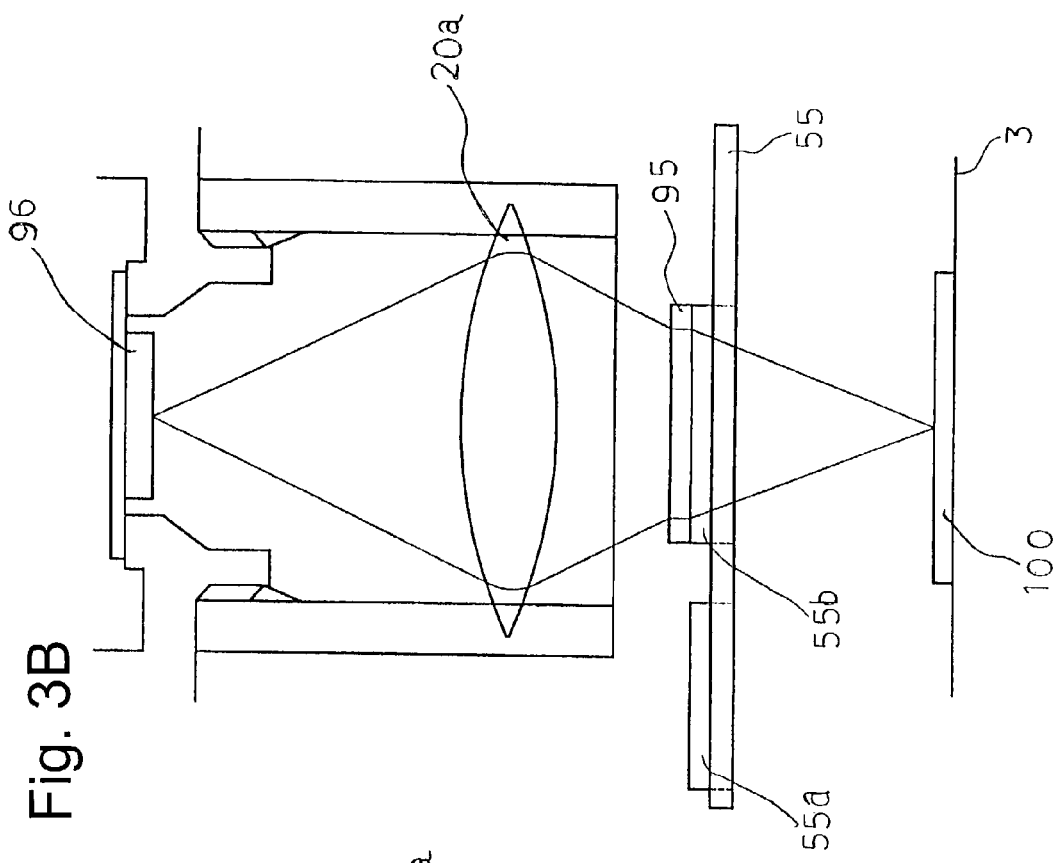
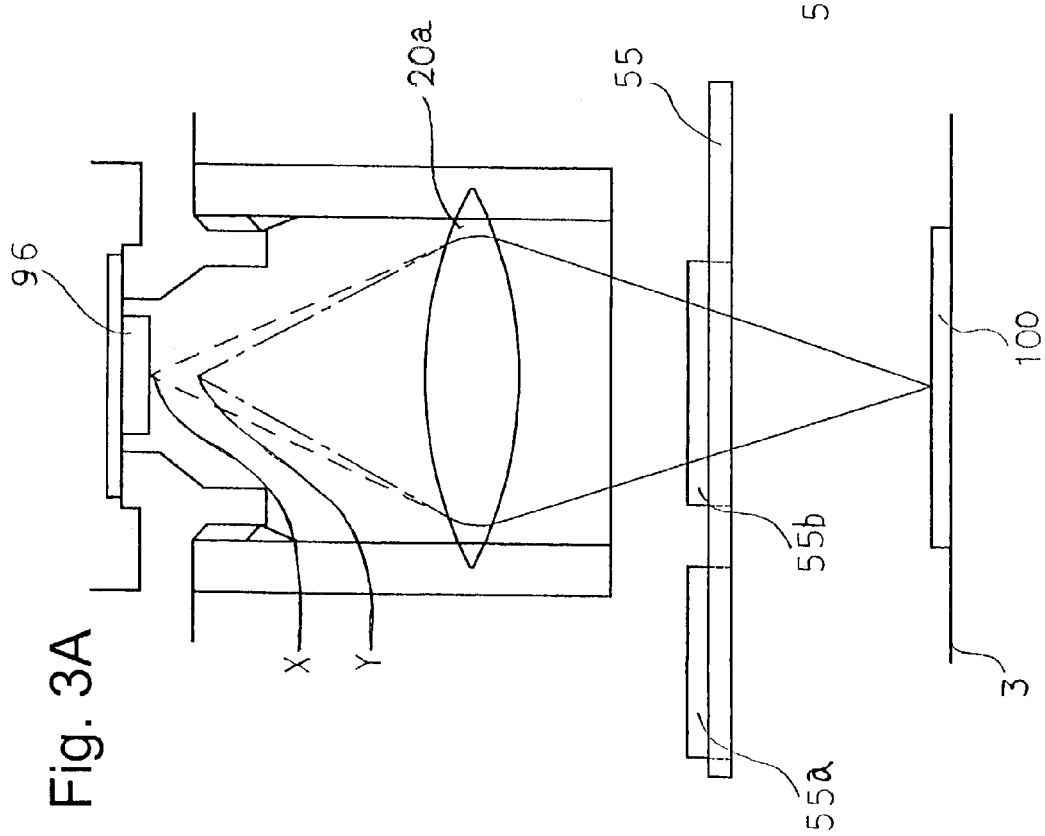
Fig. 3A
Fig. 3B

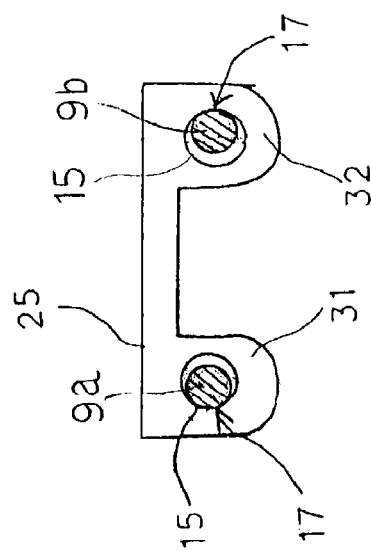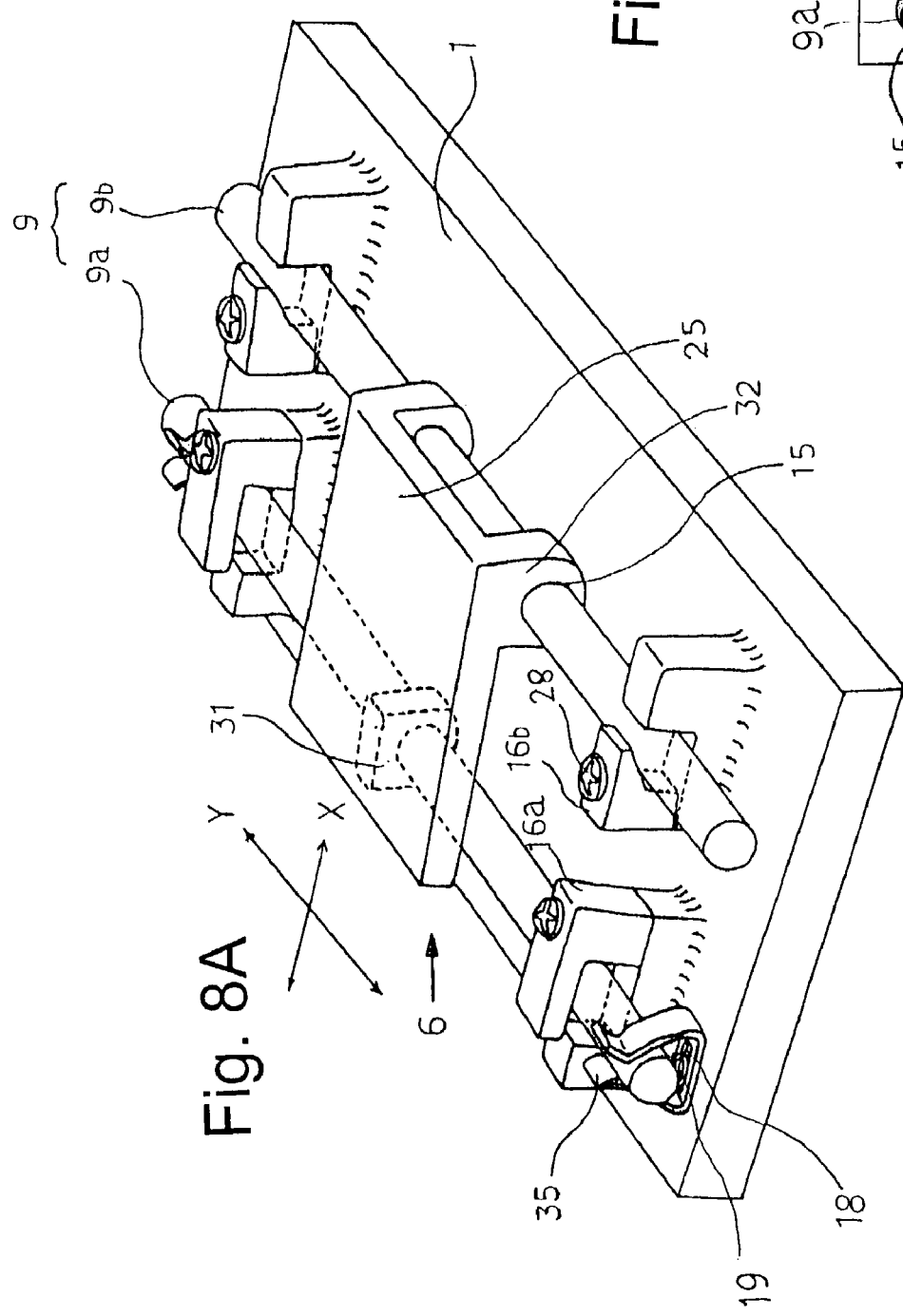

DEVELOPING APPARATUS AND IMAGE PROCESSING SYSTEM WITH THE DEVELOPING APPARATUS

BACKGROUND OF THE INVENTION

1. Field of the Invention

The present invention relates to a developing apparatus for developing a substance to be examined, for example, such as germs or bacteria, as a substance to be developed, and an image processing system for processing image data developed, and particularly, to a developing apparatus of an optical enlarging system in which a place bed on which a substance to be developed is placed is moved in a direction of axis of ordinate and in a direction of axis of abscissa nearly orthogonal to each other whereby the developing surface is divided into a plurality of areas to develop the substance to be developed, and an image processing system provided with such a developing apparatus as described.

2. Description of the Prior Art

In food hygiene fields or the like, there has been heretofore widely utilized an apparatus for detecting and measuring microorganisms such as bacteria which are present in food or the like. Microorganism detecting methods in these apparatuses include a culture method for cultivating a microorganism cell or the like on a plane culture medium formed to be solid by agar-agar or gelatin, and calculating a resultant colony (a group of germs) as the number of live-germs, an ATP (adenosine 3 phosphoric acid) detection method for detecting fluorescence generated from reaction between light-emitting protein originated from a firefly to judge the presence of microorganisms, or a fluorescent dyeing method for using a fluorescent reagent different in wavelength, utilizing fluorescent dyeing, and detecting nature different in germ by one-time processing. Various methods have been utilized according to the environments for detecting microorganisms such as germs.

As one example of such an apparatus as described above, in Japanese Patent Laid-Open No. 2001-286296 Publication is disclosed a microorganism measuring apparatus for confirming the number of live-cells and dead-cells in the substance to be examined. In this apparatus, a solution in which microorganisms are contained is adhered to the plate surface, a detection reagent is dropped, after which an exciting-light light source is lighted from the lower part of the plate, the microorganism on the plate is emitted by fluorescent light at a fluorescent light receiving portion, and microorganisms which emit a fluorescent light by a spectral film which transmits only a specific waveform specific are emitted in light in every single substance. And by calculating the light-emitting single substances, the number of live-cells or the number of dead-cells are measured, whereby the existing live-cells are calculated to confirm the number of live-cells and dead-cells in the substance to be examined.

In the apparatus of this kind, there is utilized a developing means (hereinafter referred to as a "CCD" camera) using a charge-coupled element (hereinafter referred to as "CCD" (Charge-Coupled Devices) in which in order to convert an amount of light received into an electric signal to obtain image data, charges produced in a photodiode are stored in a capacitor, which is transmitted outside in accordance with a fixed clock to thereby enable using it as a video signal. In this case, for the charge-coupled device, there is one called a MOS type (Metal-Oxide Semiconductor), whose fundamental principle for converting light into a charge is common to the aforementioned CCD type.

Generally, the CCD camera is being widely used not only as the measuring device for microorganisms described above but also as a developing unit in a variety of fields. For example, Japanese Patent Laid-Open No. 8-241127(241127/1996) Publication discloses a surface inspection apparatus in which an illumination light is irradiated to a magnetic head, a substance to be inspected (a substance to be developed), by an illumination device, and an image signal having its transmission light or reflection light developed by a developing apparatus is processed by an image processing apparatus to detect foreign matter or defect of the substance to be inspected. This surface inspection apparatus is further equipped with a positioning mechanism for the substance to be inspected. Also in the above conventional apparatus, the CCD camera is used as a developing unit, and in order to inspect (develop) a plurality of positions of a magnetic head as an object to be inspected (developed), a stage on which the magnetic head is placed is moved in a longitudinal direction and in a lateral direction on the plane, and the inspection (development) is executed in fixed plural positions. At this time, in order to correct a focus deviation relative to an area of object to be inspected (an area of object to be developed) of the magnetic head as the stage moves, this apparatus is provided with an automatic focusing mechanism which functions so as to adjust a focal point to the surface of each area to be inspected (each area to be developed).

Incidentally, in the conventional apparatus as described, in order to eliminate the focus deviation as the substance to be developed, there is contemplated an apparatus configuration in which a substance to be developed is fixedly arranged without moving it to develop a wide range of developing areas at a time. However, under the conditions that a resolution is fixed to secure a fixed image quality, it is necessary to employ an expensive CCD corresponding to a high pixel, and in order to suppress the manufacturing cost of an inspection apparatus, a substance to be developed is unavoidably moved. Further, the above-described conventional apparatus is equipped with an automatic focusing mechanism, the high manufacturing cost and larger size of the inspection apparatus are brought forth.

Further, out of the aforementioned developing apparatus using the CCD camera, there is known an apparatus in which a stage is held free to move between a developing position at which a substance to be developed is positioned opposite the CCD camera and a detachable position of a substance to be developed away from the developing position. This developing apparatus requires an optical enlarging system developing apparatus in which a single substance to be developed is finely divided into a plurality of developing areas, and each of the finely divided developing areas is moved to a fixed developing position under the CCD camera to develop an image, and further, where a substance to be developed having a large size as compared with a developing range of the CCD camera is developed, there is necessary a carriage means in which a stage on which a substance to be developed is placed is moved in a direction of an axis of abscissa (X direction) of the developing surface and in a direction of an axis of ordinate (Y direction) orthogonal thereto to move the substance to be developed in a two-dimensional direction (X-Y), whereby the substance to be developed is divided into a plurality of developing areas, and image data is obtained every area thus divided.

In the conventional developing apparatus as described, the substance to be developed is placed on the apparatus, or the moving mechanism for moving the substance to be developed from the detachable position for removing it from the apparatus to the developing position under the CCD camera, and the moving mechanism for moving the substance to be developed in the X-Y direction within the developing area are constituted by separate moving means, or a 2-dimensional moving mechanism is employed which is able to drive simultaneously the movement in the X direction within the developing area and the movement in the Y direction. Therefore, the mechanism of the apparatus becomes complex, as a consequence of which the large size and higher cost of the apparatus can not be avoided.

It is an object of the present invention to provide a developing apparatus, preventing a developing unit for developing a substance to be inspected (substance to be developed) from larger size and higher cost, in which a movement of a substance to be developed from a detachable position to a developing area under a developing unit and a 2-dimensional a movement (a direction of axis of ordinate and a direction of axis of abscissa) of the substance to be developed in a developing area are carried out by a simple mechanism, and an image processing system for processing a plurality of image data developed by such a developing apparatus as described.

It is a further object of the present invention to provide a developing apparatus which realizes smaller size and lower cost of a developing unit for developing a substance to be inspected (a substance to be developed), and which is able to achieve desired developing accuracy without occurrence of a focus deviation with respect to a substance to be developed which moves developing areas divided into plural.

It is another object of the present invention to provide a developing apparatus which is able to maintain distance accuracy relative to a developing unit within an extremely small focus depth even if the apparatus body is not installed in an ideal horizontal state or even if vibrations are applied from outside or inside of the apparatus body, and which enables developing within a range of an extremely small vibration amount of a substance to be developed during exposure for long period of time.

BRIEF DESCRIPTION OF THE DRAWINGS

FIGS. 3A and 3B are respectively schematic views showing an optical system constituting a part of developing means;

FIG. 8A is a perspective view showing a mounting relation between the first moving means and an apparatus frame, and FIG. 8B is a view showing an engaging relation between a moving member of the first moving means and a guide rail;

DETAILED DESCRIPTION

A preferable embodiment of the developing apparatus according to the present invention will be described in detail hereinafter with reference to the accompanying drawings.

Figure 1:
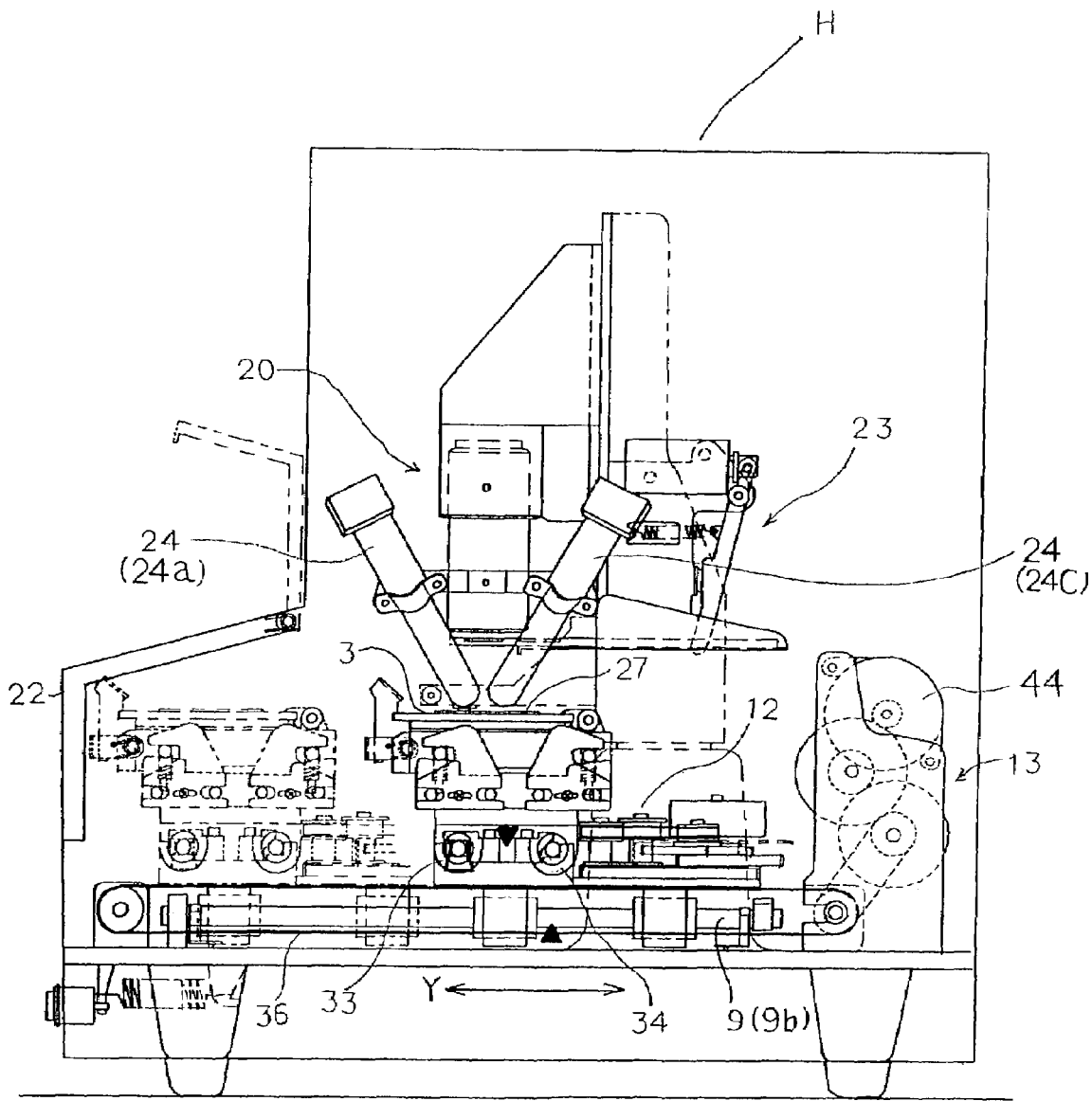
FIG. 1 is a side view showing the whole structure of one embodiment of a developing apparatus according to the present invention.
Figure 2:
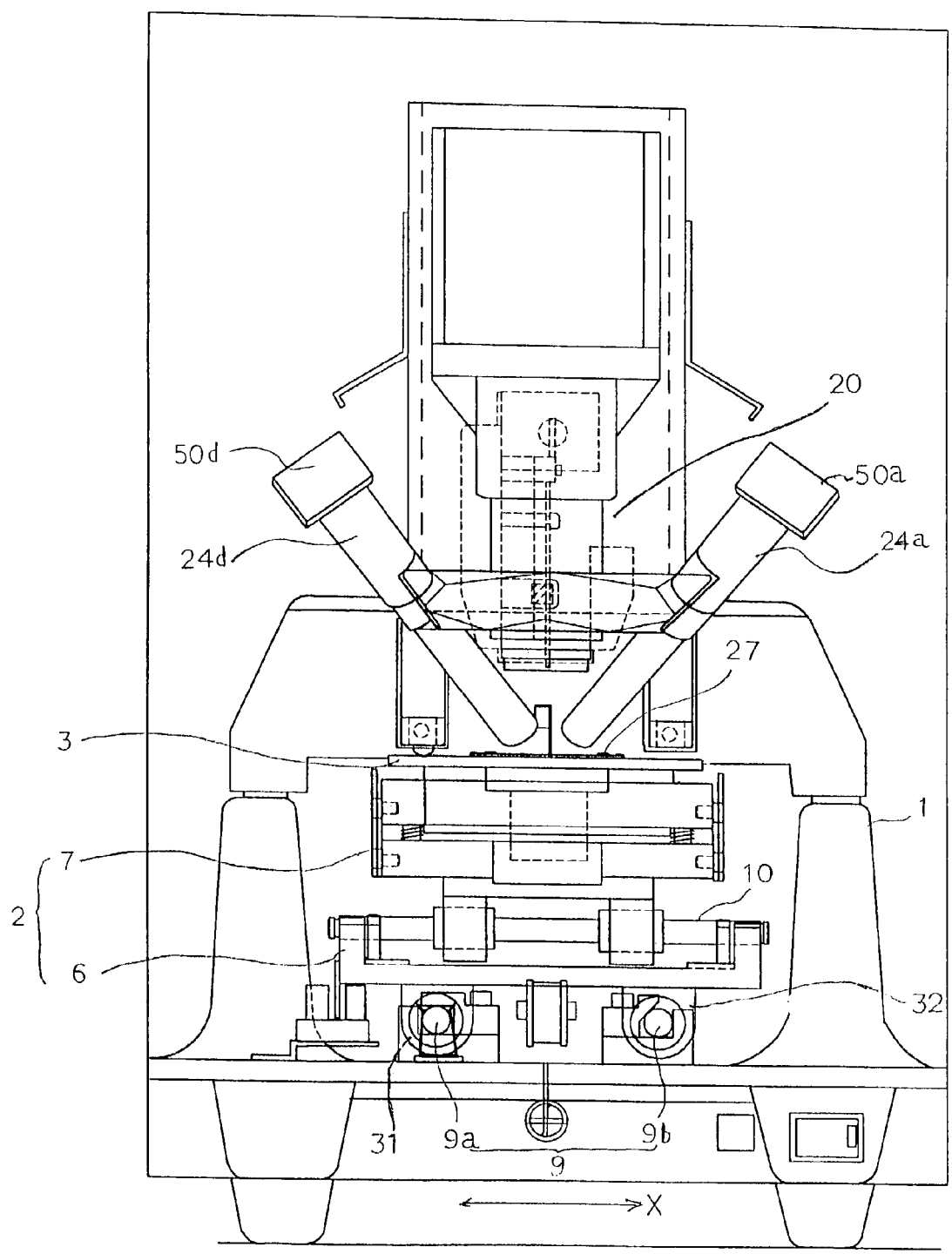
FIG. 2 is a front view showing the developing apparatus according to the present invention.

As shown in FIG. 1 and FIG. 2, a developing apparatus H has a stage 3 mounted on an apparatus frame 1 and on which a substance to be developed is placed, a first moving means which is movable on the stage 3 in a direction of axis of ordinate, a second moving means mounted on the first moving means and which is movable on the stage 3 in a direction of axis of abscissa, a light source portion 24 for irradiating light on the substance to be developed, and a developing means 20 (herein after, suitably referred to as "CCD camera") for reading a 2-dimensional image light from the substance to be developed irradiated and emitted from the light source portion 24.

The first moving means has a first guide member 9 disposed so as to extend in a Y direction on the apparatus frame 1, a first moving member 6 supported movably along the first guide member 9, and a first driving means 13 for moving the first moving member 6 along the guide member 9. In this case, the guide member in the present embodiment is constituted by a pair of guide rails 9a and 9b so that the movement and support of the first moving member 6 are stabilized.

A first sleeve 31 and a second sleeve 32 slidably fitted in the guide rails 9a and 9b, respectively, are provided under the first moving member 6. Further, the first driving means 13 comprises a driving motor 44 such as a stepping motor, and a timing belt 36 driven by the driving motor 44 through a plurality of gears and pulleys and having the first moving member 6 fixedly mounted thereon, whereby the first moving member 6 is reciprocated in a Y direction by the normal/reverse driving of the driving motor.

The second moving means has a second guide member 10 provided on the first moving member 6 and disposed so as to extend in an X direction, a second moving member 7 supported movably along the second guide member 10, and a second driving means 12 arranged on the first moving member 6 to move the second moving member 7 along the guide member 10. In this case, the guide member 10 of the present embodiment is constituted by a pail of guide rails 10a and 10b so that the movement and support of the second moving member 7 are stabilized.

Figure 5:
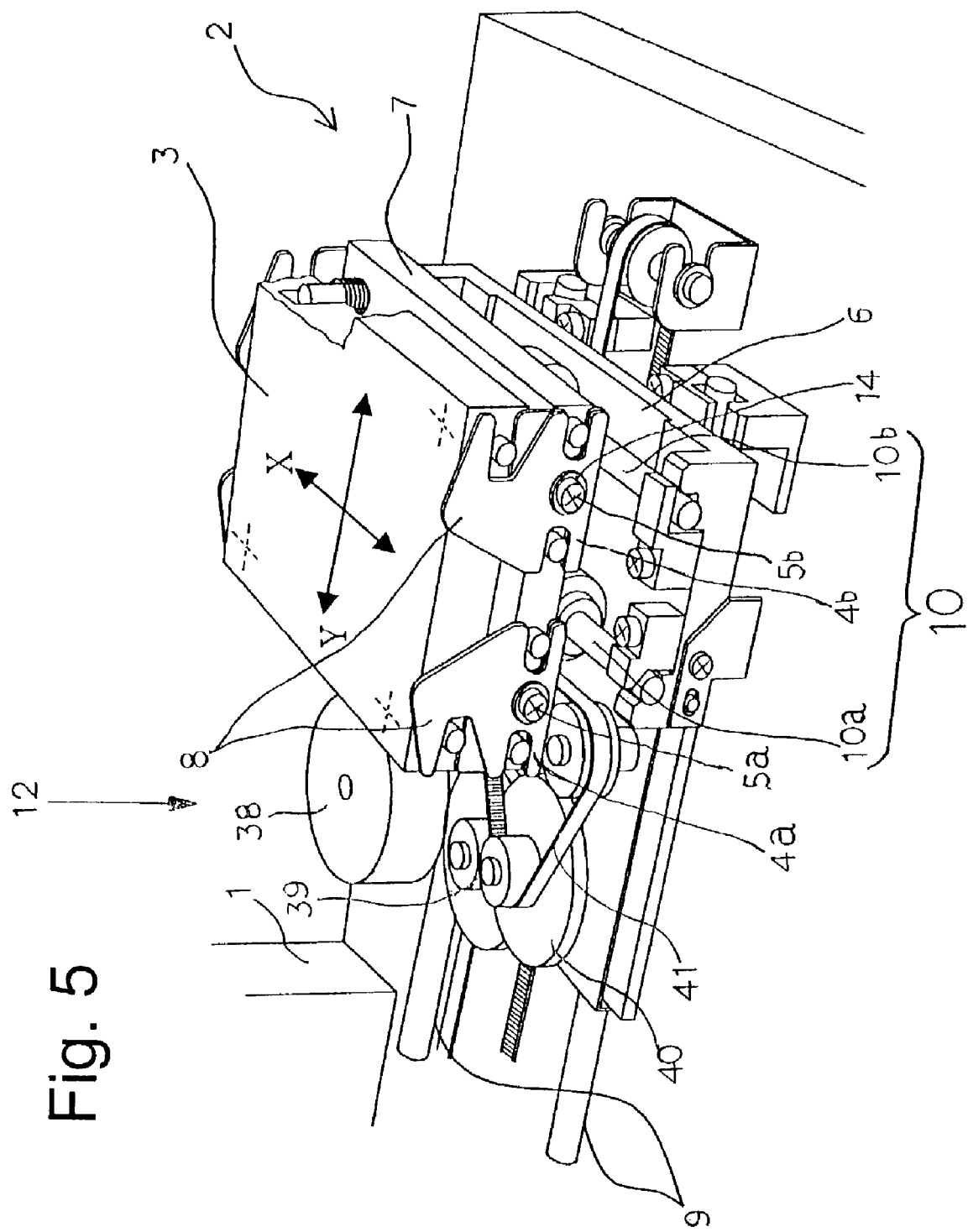
FIG. 5 is a perspective view showing a first moving means and a second moving means incorporated into the developing apparatus.
Figure 7:
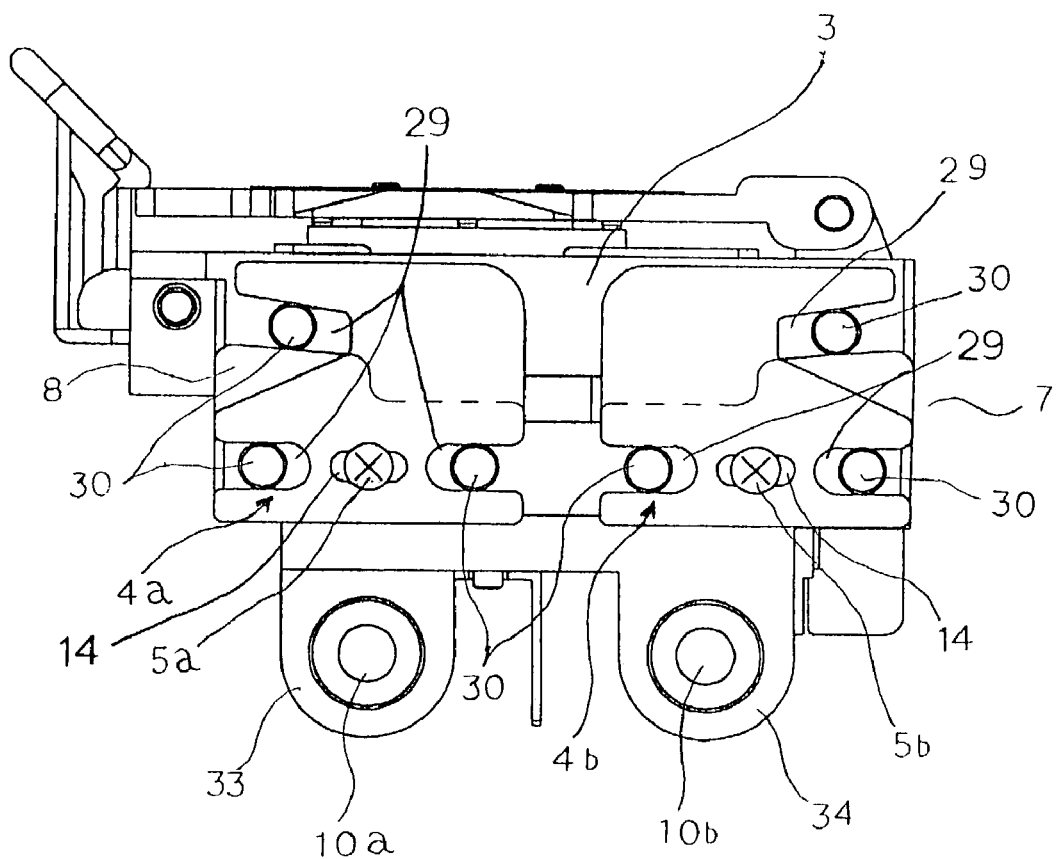
FIG. 7 is a side view showing the second moving means.

A first sleeve 33 and a second sleeve 34 slidably fitted in the guide rails 10a and 10b, respectively, are provided under the second moving member 7, as shown in FIG. 7. Further, the second driving means 12 comprises a driving motor 38 such as a stepping motor, and a timing belt 41 (a belt with teeth) driven by a driving motor 38 through a plurality of gears 40 and pulleys 39, as shown in FIG. 5, and rotational driving transmitted to the pulleys 39 is transmitted to the timing belt 41.

A part of the timing belt 41 extends through the guide member 10, and is fixedly mounted on the sides of the sleeves 33, 34 positioned at the lower part of the second moving member 7, whereby the second moving member 7 is reciprocated in the X direction as the timing belt 41 rotates and moves. With respect to the moving amount in the X direction of the second moving member 7, the second moving member 7 is moved by the amount corresponding to the predetermined number of pulses pulse-controlled.

The stage 3 is provided between the upper surface of the second moving member 7 and a kit holder 27 through a stage posture control means 4 described later. As a result, the stage 3 can be moved in the X-Y direction by the driving of the first moving member 6 and the second moving member 7 (the first moving member 6 and the second moving member 7 to enable the stage 3 to move in the X-Y direction are generally called as a moving member 2), and a substance to be developed (for example, an emblem kit or a film kit to which bacteria or the like is adhered) is mounted on the stage 3.

In the following, the preferable structure of a moving mechanism for moving the moving member 2 will be explained. With respect to the structure for movement of the first moving member 6 in the Y direction and movement of the second moving member 7 in the X direction, both first and second moving means are the same in structure. Accordingly, in the following description, the structure of the moving means in the first moving member 6 will be explained in order to avoid repetition.

Figure 9:
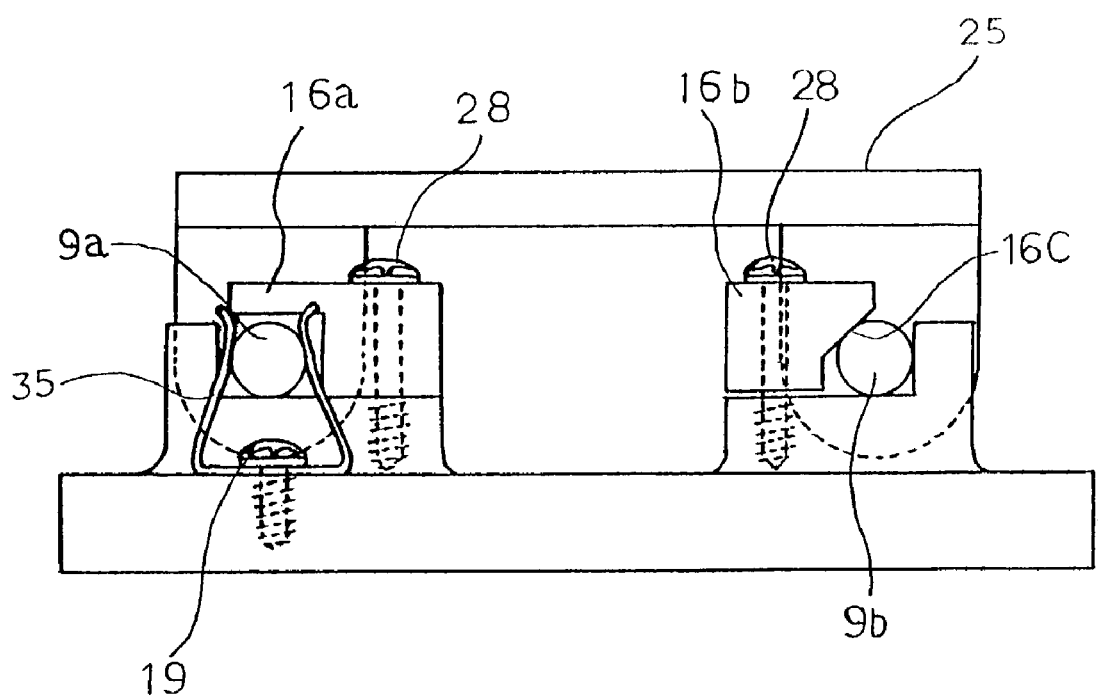
FIG. 9 is a side view showing the first moving means in FIG. 8A.

The first moving member 6 (hereinafter, a description is made of the first moving member 6 as a table 25 for simplifying the description) is supported on the guide member 9 (guide rails 9a and 9b) mounted on the frame 1, as shown in FIGS. 8A and 8B, and FIG. 9.

The mounting construction of the table 25 is constituted by comprising guide holes 15 provided in the first sleeve 31 and the second sleeve 32, respectively, provided at the lower part of the table 25, the two guide rails 9a and 9b inserted into the guide holes 15 and arranged in parallel for supporting the table 25 movably, and the apparatus frame 1 for supporting the guide rails 9a and 9b.

Out of the two guide rails 9a and 9b arranged in parallel, the one guide rail 9b is secured by stopping a guide rail securing member 10b to a securing position of the apparatus frame 1 by a screw 28. The securing member 16b is formed with an inclined portion 16c so as to hold down the guide rail 9b, and when the securing member 16b is stopped by a screw, the inclined portion 16c formed in the securing member holds down the guide rail 9b to secure it to the securing reference surface.

The other guide rail 9a is supported so as to be a swinging state at a predetermined position on the apparatus frame 1. The securing member 16a is screwed to the apparatus frame by a screw 28a so as not to come in contact with the guide rail 9a and so that the guide rail 9a is not disengaged from a predetermined position. Further, a bias means (a plate spring) 35 for biasing on the apparatus frame side is engaged with the guide rail 9a. The plate spring 35 has a function for imparting to the guide rail 9a a synthetic bias force of two bias forces, a first bias force for biasing the guide rail 9a on the apparatus frame 1 side, and a second bias force for biasing in a direction for widening or in a direction for narrowing a spacing between the two guide rails 9a and 9b. It is to be noted that a means for preventing movement in the Y direction is provided on the guide rail 9a, which is however not shown for the sake of simplicity.

The plate spring 35 is shaped to hold the guide rail 9a. A mounting hole for mounting the plate spring 35 to the apparatus frame 1 is formed to be a slot 18 whereby a mounting position of the plate spring in the X direction can be adjusted, having a shape so as to be secured to the apparatus frame 1 by a screw 19 after locating. The holding force of the plate spring 35 will be a bias force (a first bias force) on the apparatus frame side. Further, the guide rail 9a is stopped at the reference surface at a securing position by the bias force of the plate spring 35.

As described above, since the guide rails 9a and 9b for supporting movement of the table 25 are in press-contact with the reference surface of the apparatus frame 1, the focal distance of the CCD camera 20 with respect to the substance to be developed can be maintained constant.

Further, the position adjustment of the plate spring 35 in the right and left (X direction) can be of adjustment of the bias force in the direction of changing the spacing between the two guide rails 9a and 9b, and the fitting-play suppression force and the frictional force of an insert portion 17 can be simultaneously adjusted in strength and weakness (the second bias force).

The insert portion 17 of the guide rails 9a and 9b of the guide holes 15 is caused to have a nearly uniform coefficient of friction. As shown in FIG. 8B, when the guide rails 9a and 9b are inserted into the guide holes 15, an allowance of 2 to 3 μm is formed relative to a diameter of the guide rail.

The insert portion 17 is caused to have the nearly uniform coefficient of friction whereby the static frictional force for keeping a stationary state and the dynamic frictional force for keeping a nearly stationary state described above are constant irrespective of the moving place of the carriage 2.

As described, the synthetic bias force of two bias forces consisting of the first bias force for biasing on the apparatus frame 1 side and the second bias force for biasing in the direction for widening and in direction for narrowing the spacing between the two guide rails 9a and 9b is applied to the guide rail 9a, whereby in the movement of the moving member 2 in the Y direction, the distance accuracy relative to the developing section can be maintained within an extremely small focal depth, and the suppression effect of the vibration of the substance to be developed is constant irrespective of the moving place of the moving member 2. Further, since the guide rail is in press contact with the reference surface of the apparatus frame 1, the focal distance of the CCD camera 20 with respect to the substance to be developed can be maintained constant.

Further, even in the circumstances in which the guide rail is not in the ideal installation state, an insertion play in the insert portion 17 is eliminated, the suppression force against the vibration or inclination is improved, the adequate static frictional force and the dynamic frictional force are produced by the coefficient of friction of the insert portion and the bias force applied thereto to keep the table 25 in the stationary state or in the nearly stationary state, and the suppression force against the vibration or inclination can be enhanced.

As mentioned above, the first moving member 6 is reciprocated in the Y direction through the timing belt 36. This Y direction joins a substance-to-be developed detachable area on this side of the apparatus with a developing execution area on the deep side of apparatus, and the first moving member 6 is reciprocated by the normal/reverse driving of the driving motor.

In this case, the maximum moving distance of the first moving member 16 is set to be longer than the maximum moving distance of the second moving member 7 which moves in the direction nearly orthogonal to the first moving member. That is, the moving range of the stage 3 in the Y direction by the first moving means is set between the developing execution area of the substance to be developed under the CCD camera 20 and the developing substance detachable area for mounting or detaching the substance to be developed withdrawn from the developing execution area, and the moving range of the stage 3 in the direction of axis of abscissa by the second moving means is set within the developing execution area of the substance to be developed under the CCD camera 20.

As described above, the first moving means takes charge of the movement for moving the stage 3 from the detachable position to the developing position under the CCD camera 20 and the movement of the substance to be developed in the developing area in the direction of axis of ordinate (Y direction). And the second moving means takes charge of the movement of the stage 3 in the direction of axis of abscissa (X direction) in the developing area. Thereby, the present developing apparatus realizes the movement by the simple mechanism eliminating the complexity of the moving mechanism. Further, by using the moving means in the first and second independent unidirections, a 2-dimensional moving mechanism which enables simultaneous driving of the movement in the X direction and the movement in the Y direction of the substance to be developed in the developing area is unnecessary to enable miniaturization of the size particularly in the plane direction in the apparatus. Furthermore, the first driving means 13 and the second driving means 12 are selectively driven to thereby enable simplification of the driving mechanism and control thereof.

The CCD camera 20 has, as shown in FIG. 2, FIGS. 3A and 3B, a lens 20a for condensing light regulated by a filter means 55 fixedly mounted on the frame 1 to selectively transmit light from a substance to be developed 100 on the stage 3 and an optical path adjusting means (adjusting glass 95), and a photoelectric conversion means 96 for receiving forming light of the lens 20a to convert it to an electric signal.

FIG. 3A shows a focal position at which the lens 20a focuses light of a first waveform having passed through a filter 55b for receiving light from the substance to be developed 100. A focal position X is a focal position where light from the substance to be developed 100 against which light is irradiated, and the focal position coincides with the light receiving surface of the photoelectric conversion means 96. A focal position Y is a focal position where light from the substance to be developed 100 against which light of a second wavelength is irradiated, and the focal position Y is this side of the light receiving surface of the photoelectric conversion means 96.

In order to solve a deviation of the focal position caused by difference in wavelength of light from the substance to be developed 100, there is provided, for adjustment of an optical path length, an exchangeable optical path length adjusting means which is a member separately from a filter in order to adequately collect a difference (aberration) of the light path length even at the time of changing irradiating light, as shown in FIG. 3B.

In an example shown in FIG. 3B, where light of the second wavelength was received, the light path length adjusting member is placed on the filter 55b. In this example, the light path length adjusting member as the light path length adjusting means is adjusting glass 95. Light from the substance to be developed 100 is refracted by the adjusting glass 95 to regulate the light path length. By this adjusting glass 95, the focal position of all image having passed through the lens 20a coincides with the light receiving surface of an image sensor 96. By the adjusting glass 95, the light path length is regulated, and precise light adjusted to the focal distance even with respect to light in a different wavelength area from the substance to be developed can be obtained.

As described above, in the light path length adjusting means, the adjusting glass 95 is placed on the predetermined filter to regulate the focal position. The movement of the filter unit 55 is carried out by a filter moving portion 23 (see FIG. 1) in accordance with the instructions from a filter control means (not shown) on the basis of information of exposure means and irradiation means, and information of kinds of present filters.

Figure 4:
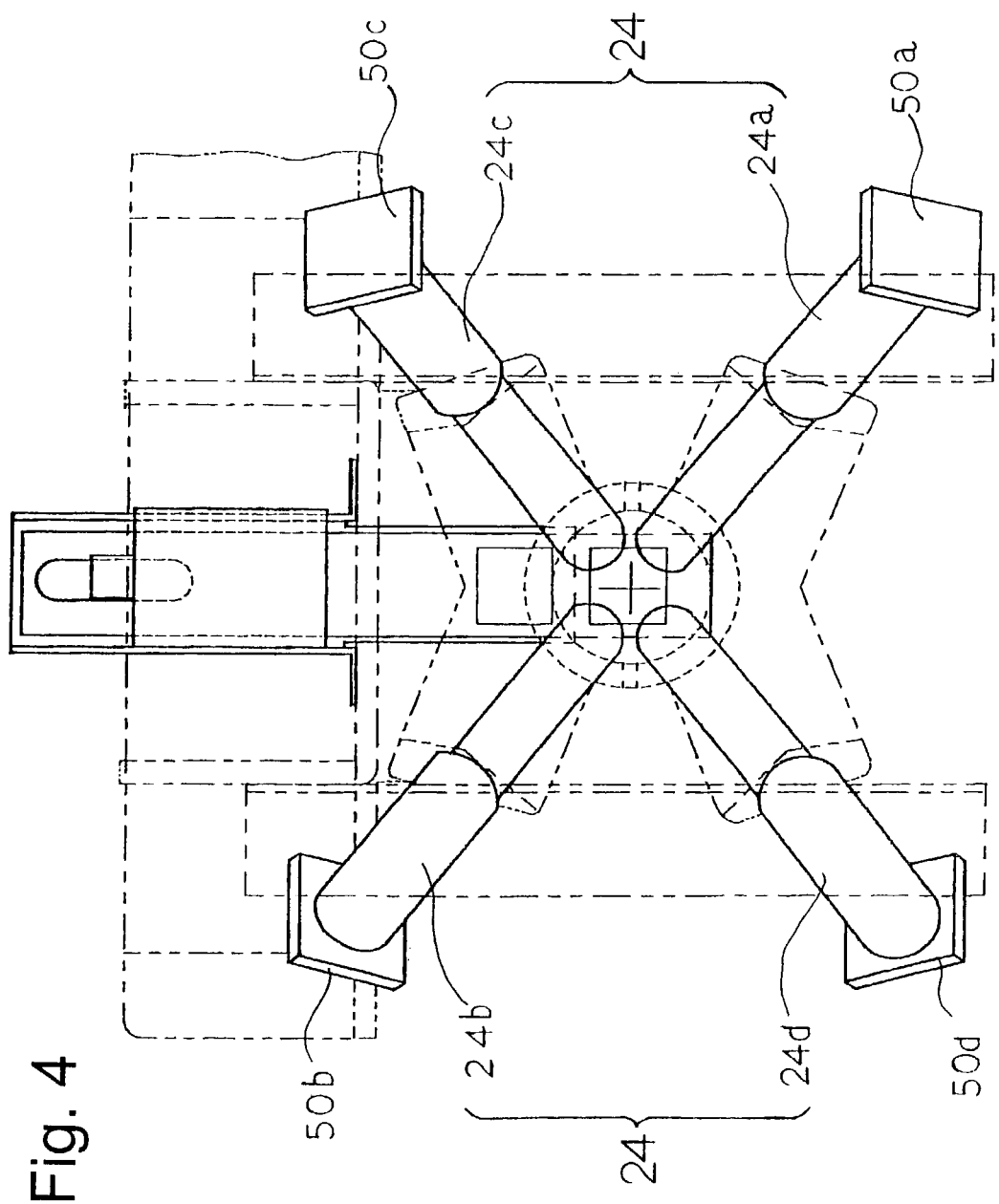
FIG. 4 is a plan view showing a light source portion of the developing apparatus.

The light source portion 24 has a function to irradiate light on the stage 3, as shown in FIG. 4. The light source portion 24 in the present embodiment is constituted by four rod light sources 24a, 24b, 24c, and 24d. The rod light sources 24a to 24d are provided with base plates 50a, 50b, 50c and 50d, respectively, on the ends thereof, and light emitting diodes are disposed on the base plates directed inwardly of the rods. Where it is necessary to irradiate light in two different wavelength areas from the light source portion 24, light emission by the same wavelength (main wavelength: 360 mm) is done by the rod light source 24a and the rod light source 24b, and light emission by the same wavelength (main wavelength: 536 mm) is done by the rod light source 24c and the rod light source 24d. The U360 filters which are a cut filter for cutting the skirts which stand in the way in the respective light emitting distributions are disposed within the rod light sources 24a and 24b. The BP 535 filters are disposed within the rod light sources 24c and 24d to sharpen the light emitting distributions. Further, where irradiation of light of a third different wavelength is necessary, a third pair of rod light sources may be additionally installed.

Next, the structure of the stage posture control means 4 will be explained. The stage posture control means 4 has a function to make the stage 3 disposed on the moving member 7 to have a free inclined posture within a predetermined range, and carries out accurate horizontal-position adjustment of the stage 3.

The stage posture control means 4 has an elastic member (spring 11) disposed between the stage 3 and the second moving member 7, and wound on the shaft center at respective positions corresponding to four corner portions of the stage 3 to bias the stage 3 upwardly with respect to the second moving member 7, and a connecting member 8 for connecting the stage 3 to the moving member 7.

The connecting member 8 is provided with an inclination adjusting means for adjusting an inclination of the stage 3, and a fixing means 5 for fixing the stage 3. In this case, the connecting member 8 comprises a structure of two sets having a plurality of concave portions 29, two pairs (four in total) of which are arranged opposite the side wall surface side of the stage 3, and a relative position between the moving member 2 and the state 3 is fixed by the fixing means 5 (fixing screws 5a to 5d). That is, the stage 3 is supported so as to maintain a predetermined (horizontal) posture through the connecting member 8 and the fixing means against the bias force of a spring 11 upward, whereby a fixing positional relation therebetween becomes reliable to secure parallelism of the state 3 with respect to the developing surface of the developing means.

Adjustment of the inclination of the stage 3 is done by the inclination adjusting means (shown by reference numerals 4a and 4b in FIG. 7) provided on the connecting member 8, the fixing screws 5a, 5b for fixing the connecting member 8 to the second moving member 7, a slot 14 formed in the connecting member 8 to enable adjustment of the fixing positions of the fixing screws 5a and 5b, a plurality of concave portions 29 provided in the connecting member 8, and a plurality of pin-like convex portions 30 provided on the sides of the stage 3 and the second carriage 7 opposite the connecting member 8 and engaged with the plurality of concave portions 29, respectively.

Specifically, the stage 3 is located by engagement between the plurality of pin-like convex portions 30 provided on the sides of the stage 3 and the second carriage 7 opposite the connecting member 8 and the plurality of concave portions 29 of the connecting member 8. For the purpose of achieving predetermined locating (determination of an posture of the stage 3), the plurality of pin-like convex portions 30 can be moved along the contact surface of the concave portions 29 within the concave portions 29 of the connecting member 8. Further; the connecting member 8 can be relatively moved with respect to the fixing screws 5a and 5b corresponding to the relative movement by the concave portions 29 and the convex portion 30 by the slot 14 formed in the connecting member 8. The plurality of control (fixing) positions are arranged opposite the side wall surface side of the stage 3 whereby the stage 3 may assume a free inclined posture within the predetermined range, and accurate adjustment of a horizontal position of the stage 3 becomes enabled.

In the following, the posture control of the stage with respect to a adjustment reference position p0 provided on the stage 3 surface will be described. In the present embodiment, it is possible to carry out inclination adjustment in the Y direction and inclination adjustment in the X direction by the inclination adjusting means, and here, the inclination adjustment in the Y direction and the inclination adjustment in the X direction are done by a first inclination adjusting means and a second inclination adjusting means, respectively.

As the first inclination adjusting means, for example, inclination adjusting means 4a and 4b shown in FIGS. 5 and 7 can be used, and as the second adjusting means, for example, the inclination adjusting means 4a and 4b shown in FIGS. 5 and 7 together, that is, two inclination adjusting means 4a, or two inclination adjusting means 4b disposed on both side wall surface sides of the stage 3 in the X direction can be used.

Here, a description is made such that the adjusting means 4a and 4b disposed on this side of the stage 3 in FIG. 5 (in FIG. 6, disposed on the left side) are taken as the first inclination adjusting means, and the adjusting means 4a together disposed in the X direction in FIG. 5 (in FIG. 6, disposed on the upper side) are taken as the second inclination adjusting means.

The first inclination adjusting means regulates so that the stage 3 is arranged in parallel with the guide rail 9a as first guide member for guiding the first moving member 6 movably, and adjustment is made so that a first height adjusting position p1 and a second height adjusting position in a developing area A are the same height position.

First, the first height adjusting position p1 is positioned at a height adjusting reference position p0. And, all L-shaped (right angle) fixture is set on the height adjusting reference position p0, and the corresponding connecting member 8 is stopped by the fixing screw 5a. The fixture used in the present embodiment is not one having a wide surface (an area surface corresponding to a substance to be developed PG) but an extremely small one so as to grasp the height adjusting reference position p0 by a point is desirable, which is necessary to have rigidity.

Next, after the fixture has been removed once, the first moving member 6 is moved to position the second height adjusting position p2 at the height adjusting reference position p0, after which the fixture is again set and the corresponding member 8 is stopped by the fixing screw 5b. Thereby, the inclination of the stage 3 with respect to the guide rail 9b is regulated in the developing area A, and positioning is made so that both are arranged in parallel.

Successively, the adjustment by the second inclination adjusting means is carried out. The second inclination adjusting means carries out adjustment so that the stage 3 is arranged in parallel with the guide rail 10a as a second guide member for guiding the second moving member 7 movably, and adjustment is carried out so that a third height adjusting position p3 and a fourth height adjusting position p4 assume the same height position.

Figure 6:
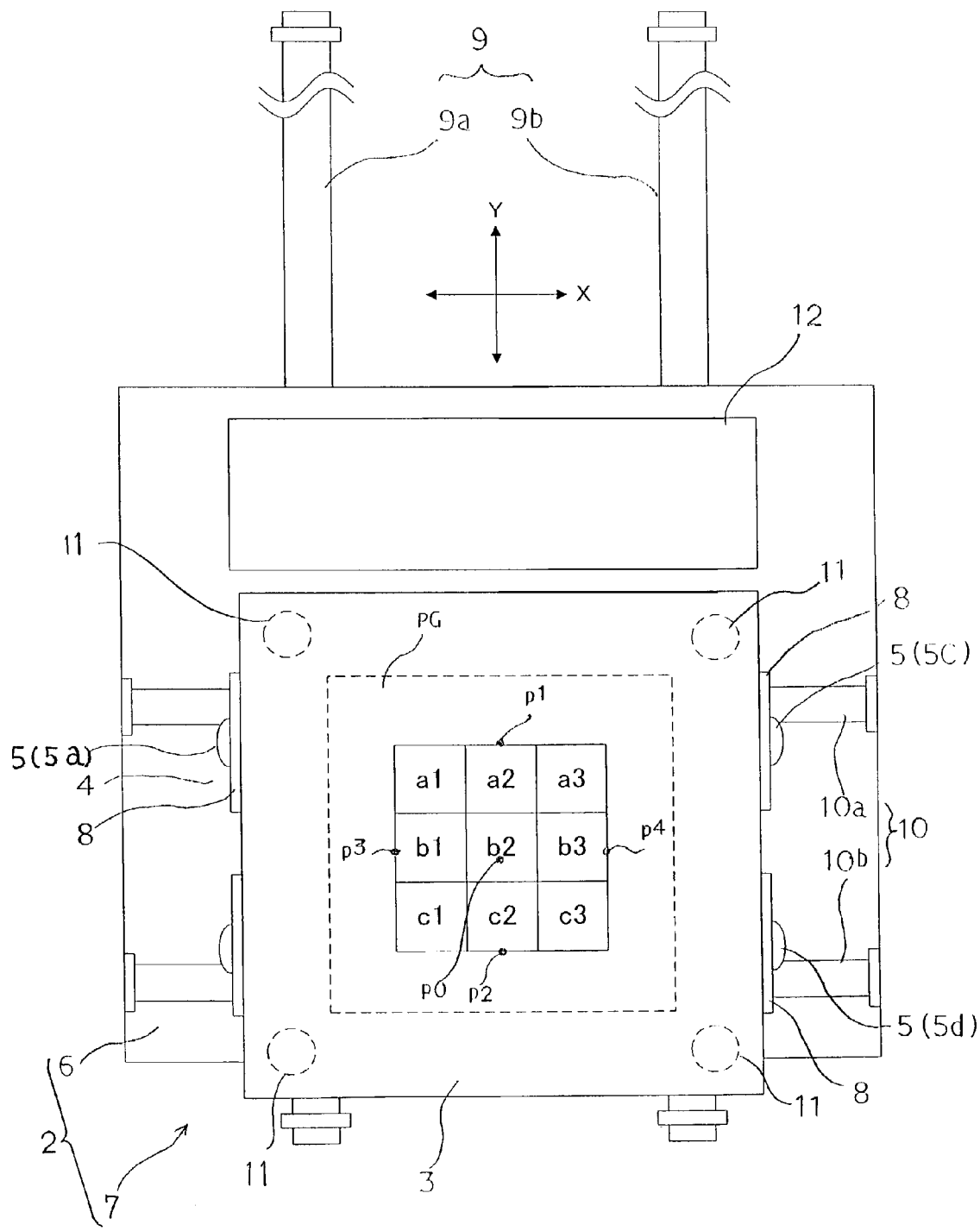
FIG. 6 is a plan view showing a stage.

In this case, the third height adjusting position p3 is positioned at the height adjusting reference position p0, but here, only confirmation of height by the fixture is carried out, then the fixture is once removed, after which the second moving member 7 is moved to position the fourth height adjusting position p4 at the height adjusting reference position p0, and afterwards, the fixture is again set to stop the corresponding connecting member 8 by the fixing screws 5c and 5d (in this case, the deep side of the stage 3 in FIG. 5, and the right side in FIG. 6). Thereby the inclination of the stage 3 with respect to the guide rail 10 is regulated ill the developing area A, and positioning is made so that both are arranged in parallel.

By the adjustment of inclination of the stage 3 described above, the stage 3 is positioned in parallel with the guide rails 9a and 10a in the developing area A, as a consequence of which the posture of the stage 3 is positioned accurately even by the movement of the moving member 2, and the developing accuracy of the CCD camera 20 with respect to the developing area A can be maintained.

It is noted that the position adjustment for horizontal posture control of the stage 3 is not limited to the above-described structure, but modification may be made as mentioned below. That is, the stage posture control means 4 may be provided on the side wall surface of the stage 3 in the same direction as the Y direction which is a moving direction of the first moving member or, alternatively, a height position in up and down directions produced in an end upstream and in an end downstream in the moving direction of the stage 3 in the Y direction which is a first direction of the stage 3 may be adjusted.

While in the above-described embodiment, a description has been made of the position adjustment (inclination adjustment) of the stage 3 with respect to the guide rails 9a and 10a, it is needless to say that similar adjustment can be made with respect to the guide rails 9b and 10b. In this case, use can be made such that the reference numerals 4a and 4b disposed on the deep side (right side in FIG. 6) of the stage 3 in FIG. 5 are taken as a first inclination adjusting means, and the reference numerals 4b together in FIG. 5 (lower side in FIG. 6) are taken as a second inclination adjusting means.

Further, in the description of the above-described embodiment, after adjustment in the Y direction which is a moving direction of the first moving member 6, the adjustment in the X direction which is a moving direction of the second moving member 7 has been carried out, however the order of adjustment is not limited thereto but after adjustment in the X direction which is a moving direction of the second moving member 7, the adjustment in the Y direction which is a moving direction of the second moving member 6 may be carried out. Further, while the inclination adjustment of the stage 3 has been carried out with respect to four places positioned on the side-wall side of the stage 3, it is noted that three places out of the four places may be provided as adjustment places.

Next, the horizontal position adjustment of the surface of the stage 3 with respect to the CCD camera will be described.

The frame 1 has the surface extending in a nearly vertical direction, and the CCD camera 20 is mounted at a predetermined position of the aforesaid surface. The stage 3 is constituted so as to hold its posture at an angle of nearly 90 degrees with respect to the mounting surface of the CCD camera 20 and in a nearly horizontal direction, and in the manufacturing process of the present apparatus, horizontal positioning of the stage 3 is carried out using, for example, an L-shaped (right angle) fixture. That is, one end of the fixture is adjusted to the mounting surface of the frame 1 on which the CCD camera 20 is not mounted, and the other end is adjusted onto the stage 3. In this case, it is important that the other end surface of the fixture is formed to have at least a surface not less than the area of the developing area A of a substance to be developed PG placed on the stage (for example, an area surface corresponding to the substance to be developed PG).

As described above, in the state that the fixture is set therebetween, the stage 3 is fixed by the fixing means 5 whereby the horizontal posture of the stage 3 is formed. In the position adjustment by that surface, tile spring 11 is disposed between the stage 3 and the second moving member 7 and at the position corresponding to four corner portions of the stage 3 to thereby facilitate work in connection with the position adjustment for the horizontal posture of the stage 3.

As described above, the position adjustments in horizontal direction, vertical direction, longitudinal direction, and lateral direction of the stage 3 position can be made by simple structure, and the distance between the developing device such as the CCD camera 20 and the stage 3 can be always maintained constant. Further, the stage posture control means 4 having the structure as described above is disposed whereby the CCD sensor of the developing unit for developing the substance to be developed need not be an expensive CCD corresponding to a high pixel, the smaller size and lower cost of the whole developing apparatus are realized as an inexpensive structure while obtaining image quantity as desired. Further, the adjustment of the posture of the stage 3 which is movable for developing can be made by a simple structure to thereby achieve the desired developing accuracy without occurrence of a focal deviation with respect to the substance to be developed which moves a plurality of developing areas.

Figure 10:
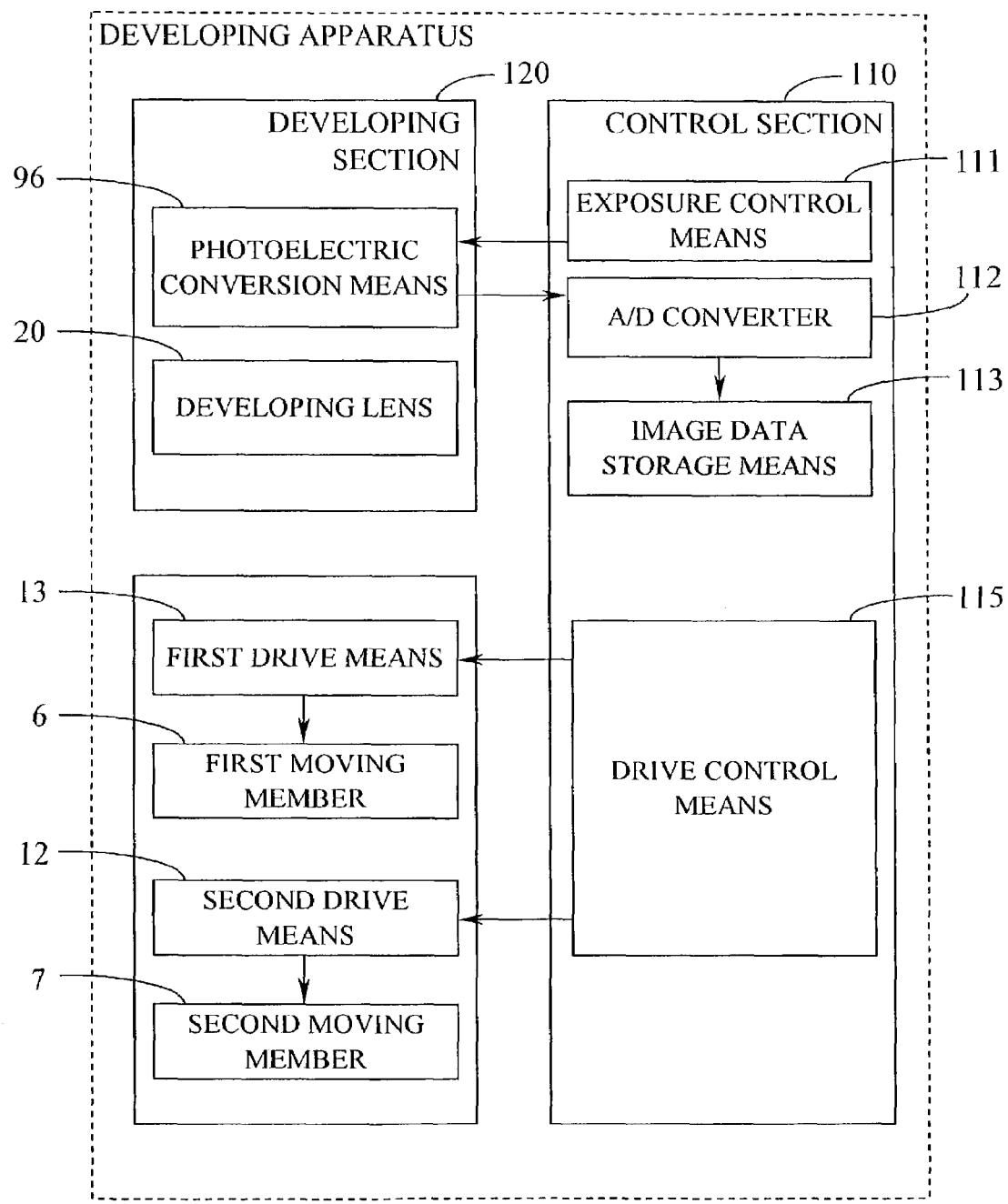
FIG. 10 is a block diagram in conjunction with the function of the developing apparatus as an apparatus unit.
Figure 11:
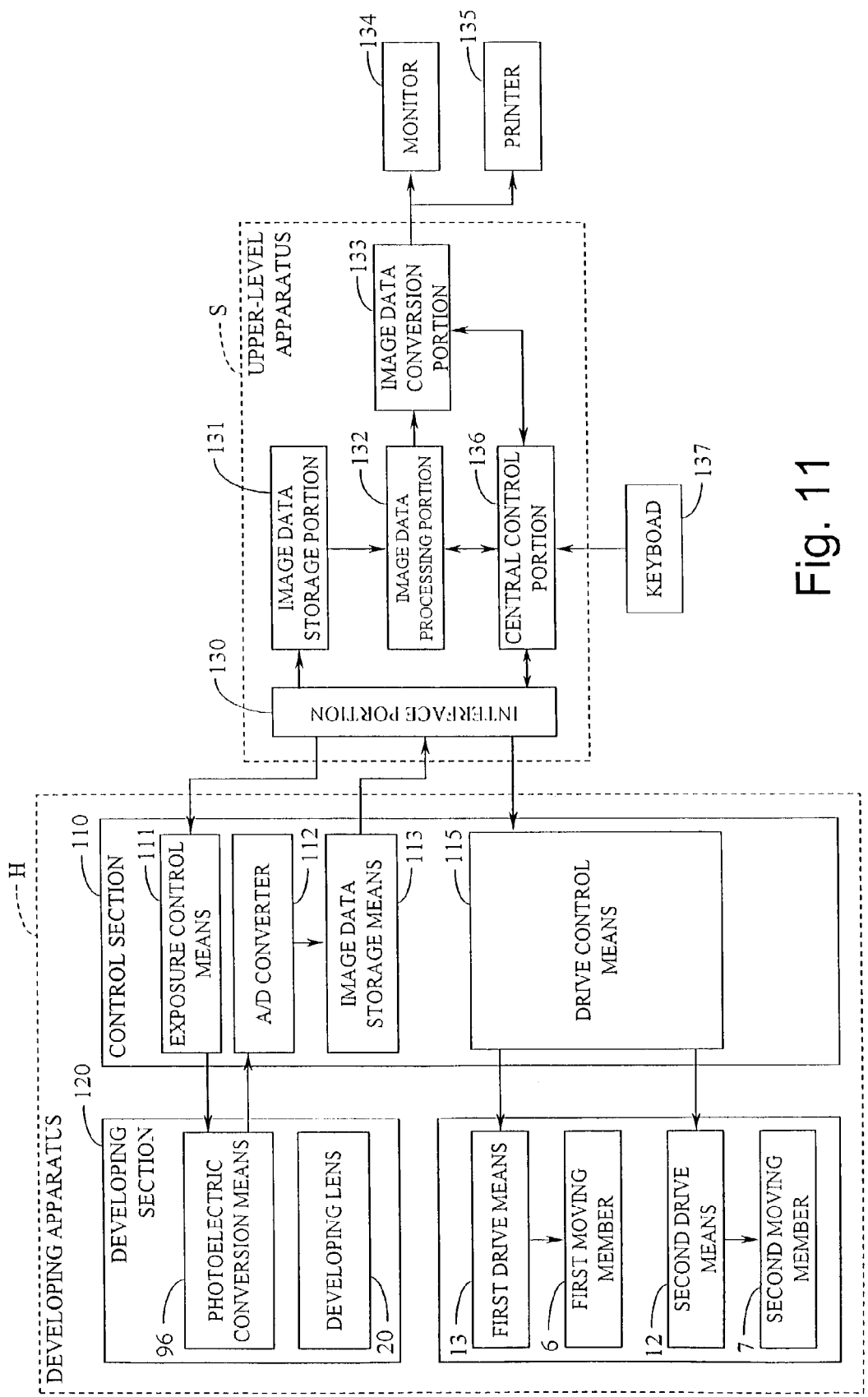
FIG. 11 is a block diagram of the system structure including an upper level device connected to the developing apparatus.

Next, the aforementioned developing apparatus and the structure of a drive control system of an image processing system having such a developing apparatus as described will be described with reference to FIGS. 10 and 11. FIG. 10 is a block diagram relating to the function of the developing apparatus as a single apparatus, and FIG. 11 is a block diagram relating to the system structure including the function of an upper-level apparatus connected to the above-described developing apparatus.

A control section 110 of the developing apparatus H is provided to control operation of parts in the apparatus, and here, a general CPU is used, which is connected to the upper-level apparatus. The control section 110 performs control in order to operate the a developing section 120 or the drive means 13, 12 for moving the first moving member 6 and the second moving member 7 in accordance with an operation instruction signal from the upper-level apparatus, for example.

An exposure control means 111 transmits a signal relating to start or reset of a clock relating to developing (exposure) time control to the photoelectric conversion means 96. A drive control means 115 sends, for executing movement of the first moving member 6 which is a first moving means in the Y direction between a substance-to-be-developed detachable area and an image developing area, a drive ON/OFF signal to the drive motor 44 as the first driving means, and sends, for executing movement of the second moving member 7 which is a second moving means in an image reading area in the X direction, a drive ON/OFF signal to the driving motor 38 as the second driving means 12. The two drive motors are selectively driven and controlled to thereby suppress consuming power of the apparatus and to achieve the miniaturization of the structure relating to a power supply. Alternatively, a structure for driving and controlling both at the same time may be employed not remitting to the former. In this case, movement of the stage 3 to a predetermined position can be done quickly to achieve reduction in processing time.

In the present apparatus, the control section 110 controls the drive control means 115 and the control means 111 at an individual timing to thereby carry out the operation control so that the photoelectric conversion is made in the state that the moving member 2 provided with the stage 3 is moved to a predetermined position which is a developing execution position, and afterwards it is stopped. Thereby, timing of the desired developing processing is correctly operated, interface with the external apparatus is easy, and the function of a sensor (a face sensor or an area sensor) in which a plurality of photoelectric conversion elements are arranged in a face-like fashion as the photoelectric conversion means (CCD) 96 can be achieved sufficiently.

As the upper-level apparatus S for carrying out various data processes, a general personal computer provided with a desired application can be suitably used. Various operations of the whole image processing system are executed by CPU as a central control section 136, and various operation command signals to the developing apparatus side, and a status signal showing operating state including image data and an operation error from the developing apparatus side are communicated through an interface portion 130.

When operation instructions relating to the exposure are carried out to the control section 110 within the developing apparatus by the communication route, the exposure control means 111 gives a command to the photoelectric conversion means 96 so as to carry out an expected operation. At about the same time, movement operating instructions for positioning the stage 3 to a predetermined developing area are given to the control section 110 within the developing apparatus. The operation of the developing means and the drive means on the basis of both the instructions is repeated predetermined times to thereby obtain developing data in a plurality of divisions (developing areas) The thus obtained developing data is transferred from the hotoelectric conversion means 96 to an AID converter 112 of the control section 110, and an analog video signal is converted into digital image data. In the present apparatus, the digital converted image data is once stored in an image data storage means 113 such as SD-RAM, and afterward it is transferred to the upperlevel apparatus.

The image data transferred from the developing apparatus H side is sent to and stored in an image data storage portion 131 through the interface portion 130 of the upper-level apparatus S. An image data processing portion 132 reads image data from the image data storage portion 131 to carry out predetermined processing. Here, the image data from the areas obtained by dividing the whole developing area of the substance to be developed are synthesized and processed to restore them to a single image datum. The image data processing is not limited to the aforementioned image synthetic processing, but processing for comparing and collating between a predetermined base datum and the read image data to extract an inconvenient point may be carried out or, processing for detecting an abnormal value may be carried out.

Further, an image data conversion portion 133 converts image data processed in the image data processing portion 132 into a format for monitor display (for example, includes the content such as conversion into analog data again) to display it on a monitor 134 or, RGB (light) data is converted into CMY (color) data in order to be printed by a printer 135 to print it by the printer 135.

The central control section 136 gives, in addition to give various instructions to the developing apparatus side through the interface portion 130, instructions to the image data processing portion 132 so as to synthesize and process various image data to restore them to a single image datum as described above or, gives instructions to the image data conversion portion 133 so as to execute the various data conversion.

Further, the photoelectric conversion means 96 of the developing apparatus H has been described as an area sensor, but the present invention can be also applied to a licenser, irrespective of kinds of substances to be developed as a substance to be read.

Next, the whole operation of the aforementioned developing apparatus H will be described.

When a power supply is thrown into the apparatus by the power supply switch, initial operation first starts. In the initial operation, the stag 3 moves to a reference position. The reference position is a developing position for reading a substance to be developed, and is set directly below the CCD camera 20.

When the first moving member 6 and the second moving member 7 are driven along the guide rails 9a, 9b and the guide rails 10a, 10b, the stag 3 moves to a position at which both an X-HP sensor arranged at the reference position in the X direction and a Y-HP sensor arranged at the reference position in the Y direction are turned ON.

When the initial operation is completed, the apparatus enters a waiting state. When a front cover is opened by an operator, an open signal is issued from a cover sensor (not shown). The stage 3 moves to the front which is an open position of the front cover 22 in accordance with the signal (a cover open signal). In the opening of the front cover 22, its open state is maintained by a coil spring.

When a substance to be developed is mounted on the stage 3 and the front cover is closed by an operator, a signal of a cover sensor is sent to the data processing apparatus (upper-level apparatus) connected through a predetermined interface, and the fact that preparation is ready is displayed on a display.

The operator gives instructions to the data processing apparatus to start developing. The data processing apparatus which received the instructions sends a developing start command to the developing apparatus. The control section of the present developing apparatus controls the first drive means 13 to move the stage 3 to an initial position which is a home position for reading.

The developing of a substance to be developed in the present apparatus is repetitively carried out while slightly moving a position of the stage 3. Where the external shape of a substance to be developed is of an extremely small size such as a few micron meters, for example, the whole area of an object for developing is 12 mm*9 mm, and where an area that can be obtained by one developing is 1.2 mm*0.9 mm, 100 times of developing frames are necessary. In the developing process, developing is done while moving a position ten times in the Y direction, and moving in the Y direction, which operation is repeated.

Every time developing of one frame is finished, its image data is transmitted to the data processing apparatus. After the image data has been obtained, the data processing apparatus requests the developing apparatus a request for obtaining a next frame whereby the developing apparatus carries out position moving and re-reading. In this manner, developing of necessary frames is repeated. After developing of all necessary frames has been completed, the stage 3 returns to the home position.

As described above, the first moving member 6 and the second moving member 7 are respectively provided with an individual drive motor and drive transmission mechanism, and are selectively driven. Thereby, reduction in maximum consuming electric power and positive position control in X-Y direction in the reading surface are secured. Further, as shown in FIG. 5, the second drive means 12 is constituted by a drive source mounted on the first moving member 6 to move the second moving member 7 in the X direction and a drive transmission portion. Thereby, the apparatus can be miniaturized in size particularly in the plane direction. As described above, in the present apparatus, both are not moved simultaneously due to the reduction in maximum consuming electric power and readiness of control, but naturally, both may be moved and controlled simultaneously.

In the present apparatus, adjustment of horizontal, vertical, longitudinal and lateral positions of the stage 3 can be made by the above-described simple structure, the distance between the CCD camera and the stage 3 can be always maintained constant, and as a result, the posture of the stage 3 can be positioned accurately even by movement of the moving member 2, and the developing accuracy of the CCD camera 20 with respect to developing areas at to c3 (shown in FIG. 6) can be maintained.

Further, as described above, in the developing apparatus according to the present invention, movement of a substance to be developed from a detachable position to a developing position, and movement of a substance to be developed in a developing area in the Y direction (movement of relatively long distance) are carried out by the first moving means, and movement of a substance to be developed in a developing area in the X direction (movement of relatively short distance) is carried out by the second moving means separately from the first moving means to thereby realize the apparatus comprised of a simple structure eliminating the complexity of the moving mechanism. Further, a unidirectional moving means of two independent first moving means and second moving means mounted thereon is disposed, whereby a two-dimensional moving mechanism capable of simultaneously driving movements of the substance to be developed in the X and Y directions in the developing area is not necessary, and as a result, the apparatus can be miniaturized in size particularly in the plane direction. Further, since the first drive means and the second drive means are selectively driven, simplification of the drive mechanism and control thereof is realized.

The aforementioned developing apparatus is provided with the so-called CCD camera 20 having a CCD sensor, the CCD camera 20 being fixed to and arranged on the vertical surface of the apparatus frame 1, and a substance to be developed (bacteria) which is a substance to be developed PG positioned below can be developed. In this case, by the aforementioned structure, even if the stage 3 is moved, parallelism is held so that the former is always present within the range of focal depth (60 micrometers). Therefore, for the CCD camera of the present apparatus, automatic focusing function is not necessary, and furthermore, also with respect to the CCD sensor, a more inexpensive structure is obtained without employing an expensive CCD corresponding to a high pixel. Further, since even if the stage 3 is moved, a deviation of a focal point at the time of developing with respect to a substance to be developed is suppressed, a precise and definite image is obtained.

The invention claimed is:

1. A developing apparatus for moving a stage for supporting a substance to be developed in a direction of axis of ordinate and in a direction of axis of abscissa to develop said substance, the apparatus comprising:
    developing means, secured to an apparatus frame, to develop said substance on said stage;
    first moving means, mounted on said apparatus frame, movable in said direction of axis of ordinate;
    second moving means, mounted on said first moving means, movable in said direction of axis of abscissa; and
    stage posture control means to control an inclined posture of said stage in order to hold a relative distance between said developing means and a developing area surface of said substance placed on said stage constant;
    wherein said first moving means has a first guide member in said direction of axis of ordinate provided on said apparatus frame, a first moving member, and first drive means for moving said first moving member along said first guide member,
    said second moving means has a second guide member in said direction of axis of abscissa provided on said first moving member, a second moving member, and second drive means for moving said second moving member along said second guide member, and
    said stage posture control means is disposed at a position along said directions of axes of ordinate and abscissa in a developing area of said substance on said stage.

2. The developing apparatus according to claim 1, wherein
    said second drive means is arranged on said first moving member.

3. The developing apparatus according to claim 2, wherein said first drive means and said second drive means are selectively driven.

4. The developing apparatus according to claim 1, wherein said stage posture control means is provided with fixing means arranged opposite a side-wall surface side of said stage to fix a relative position between said second moving member within said developing area and said stage.

5. The developing apparatus according to claim 4, further comprising an elastic member disposed between said stage and said second moving member to bias said stage upwardly with respect to said second moving member, and a connecting member for connecting said stage onto said second moving member,
    wherein said fixing means fixes said connecting member against the biasing force of said elastic member whereby said stage holds a predetermined posture.

6. The developing apparatus according to claim 5, wherein said elastic member is provided at a position corresponding to four corner portions of said stage.

7. The developing apparatus according to claim 5, wherein said stage posture control means comprises first inclination adjusting means for adjusting an inclination in a first direction of said stage to the side wall surface of sad stage in the same direction as the moving direction of said first moving member, and second inclination adjusting means for adjusting an inclination in a second direction of said stage to the side wall surface of sad stage in the same direction as the moving direction of said second moving member.

8. The developing apparatus according to claim 7, wherein said fixing means is constituted so that at least one of said connecting members is fixed by said first inclination adjusting means at a position at which said stage is arranged in parallel with respect to said first guide member within said developing area, and at least one of said connecting members is fixed by said second inclination adjusting means at a position at which said stage is arranged in parallel with respect to said second guide member within said developing area.

9. The developing apparatus according to claim 1, wherein said first guide member has at least two guide rails arranged in parallel on said apparatus frame in order to support said second moving member movably in parallel, said first moving member has guide holes, in its part, which are inserted into said at least two guide rails, respectively, said developing apparatus further comprising guide rail support means having bias means provided on said apparatus frame to bias in a direction for widening or in a direction for narrowing a spacing between said at least two guide rails.

10. The developing apparatus according to claim 9, wherein said first guide member comprises two guide rails, said guide rail support means supports one of said two guide rails in a fixed state on said apparatus frame, and supports the other of said two guide rails in a floating state, and said bias means biases the other of said two guide rails toward said apparatus frame side.

11. The developing apparatus according to claim 1, wherein said developing means has a lens for condensing light from said substance, and photoelectric conversion means for receiving forming light by said lens to convert it into an electric signal, said developing means developing an image of said substance in a stationary state after said stage has been moved to a predetermined position.

12. A developing apparatus for moving a stage for supporting a substance to be developed in a direction of axis of ordinate and in a direction of axis of abscissa to develop said substance, the apparatus comprising:
    developing means, secured to an apparatus frame, to develop a substance on said stage;
    first moving means, mounted on said apparatus frame, movable in said direction of axis of ordinate; and
    second moving means, mounted on said first moving means, movable in said direction of axis of abscissa, and
    stage posture control means to control an inclined posture of said stage in order to hold a relative distance between said developing means and a developing area surface of said substance placed on said stage constant;
    wherein said stage posture control means is disposed at a position along said directions of axes of ordinate and abscissa in a developing area of said substance on said stage,
    said first moving means has a first guide member in said direction of axis of ordinate provided on said apparatus frame, a first moving member, and first drive means for moving said first moving member along said first guide member, in which a moving range of said stage in said direction of axis of ordinate by said first moving means is set between a developing execution area of said substance below said developing means and a substance detachable area for detaching said substance withdrawn from said developing execution area, said second moving means has a second guide member in said direction of axis of abscissa provided on said first moving member, a second moving member, and second drive means for moving said second moving member along said second guide member, in which a moving range of said stage in said direction of axis of abscissa by said second moving means is set within a developing execution area of said substance below said developing means, and the maximum moving distance in the direction of axis of ordinate of said stage by said first moving means is set to be longer than the maximum moving distance in the direction of axis of abscissa by said second moving means.

13. The developing apparatus according to claim 12, wherein said stage posture control means is provided with fixing means arranged opposite a side-wall surface side of said stage to fix a relative position between said second moving member within said developing area and said stage.

14. The developing apparatus according to claim 13, further comprising-f- an elastic member disposed between said stage and said second moving member to bias said stage upwardly with respect to said second moving member, and a connecting member for connecting said stage onto said second moving member, wherein said fixing means fixes said connecting member against a biasing force of said elastic member whereby said stage holds a predetermined posture.

15. The developing apparatus according to claim 14, wherein said elastic member is provided at a position corresponding to four corner portions of said stage.

16. The developing apparatus according to claim 14, wherein said stage posture control means comprises first inclination adjusting means for adjusting an inclination in a first direction of said stage to the side wall surface of sad stage in the same direction as the moving direction of said first moving member, and second inclination adjusting means for adjusting an inclination in a second direction of said stage to the side wall surface of said stage in the same direction as the moving direction of said second moving member.

17. The developing apparatus according to claim 16, wherein said fixing means is constituted so that at least one of said connecting members is fixed by said first inclination adjusting means at a position at which said stage is arranged in parallel with respect to said first guide member within said developing area, and at least one of said connecting members is fixed by said second inclination adjusting means at a position at which said stage is arranged in parallel with respect to said second guide member within said developing area.

18. The developing apparatus according to claim 12, wherein said first guide member has at least two guide rails arranged in parallel on said apparatus frame in order to support said second moving member movably in parallel, said first moving member has guide holes, in its part, which are inserted into said at least two guide rails, respectively, said developing apparatus further comprising guide rail support means having bias means provided on said apparatus frame to bias in a direction for widening or in a direction for narrowing a spacing between said at least two guide rails.

19. The developing apparatus according to claim 18, wherein said first guide member comprises two guide rails, said guide rail support means supports one of said two guide rails in a fixed state on said apparatus frame, and supports the other of said two guide rails in a floating state, and said bias means biases the other of said two guide rails toward said apparatus frame side.

20. An image processing system for moving a stage for supporting a substance to be developed in a direction of axis of ordinate and in a direction of axis of abscissa to develop said substance, and for processing an image signal of said developed substance, comprising:

developing means, secured to an apparatus frame, to develop a substance on said stage;

first moving means, mounted on said apparatus frame, and movable in said direction of axis of ordinate;

second moving means, mounted on said first moving means, movable in said direction of axis of abscissa;

stage posture control means to control an inclined posture of said stage in order to hold a relative distance between said developing means and a developing area surface of said substance placed on said stage constant;

a developing apparatus in which a maximum moving distance of said first moving means is set to be longer than a maximum moving distance of said second moving means, and said stage is arranged integral with or separately from said second moving means; and a data processing apparatus for processing an image signal of said substance, said image signal being obtained by said developing apparatus.

21. The developing apparatus according to claim 1, wherein a maximum moving distance of said first moving means is set to be longer than a maximum moving distance of said second moving means, and said stage is arranged integral with or separately from said second moving means.

22. The developing apparatus according to claim 12, wherein said stage is arranged integral with or separately from said second moving means.

* * * * *